United States Patent Office 3,490,547
Patented Jan. 20, 1970

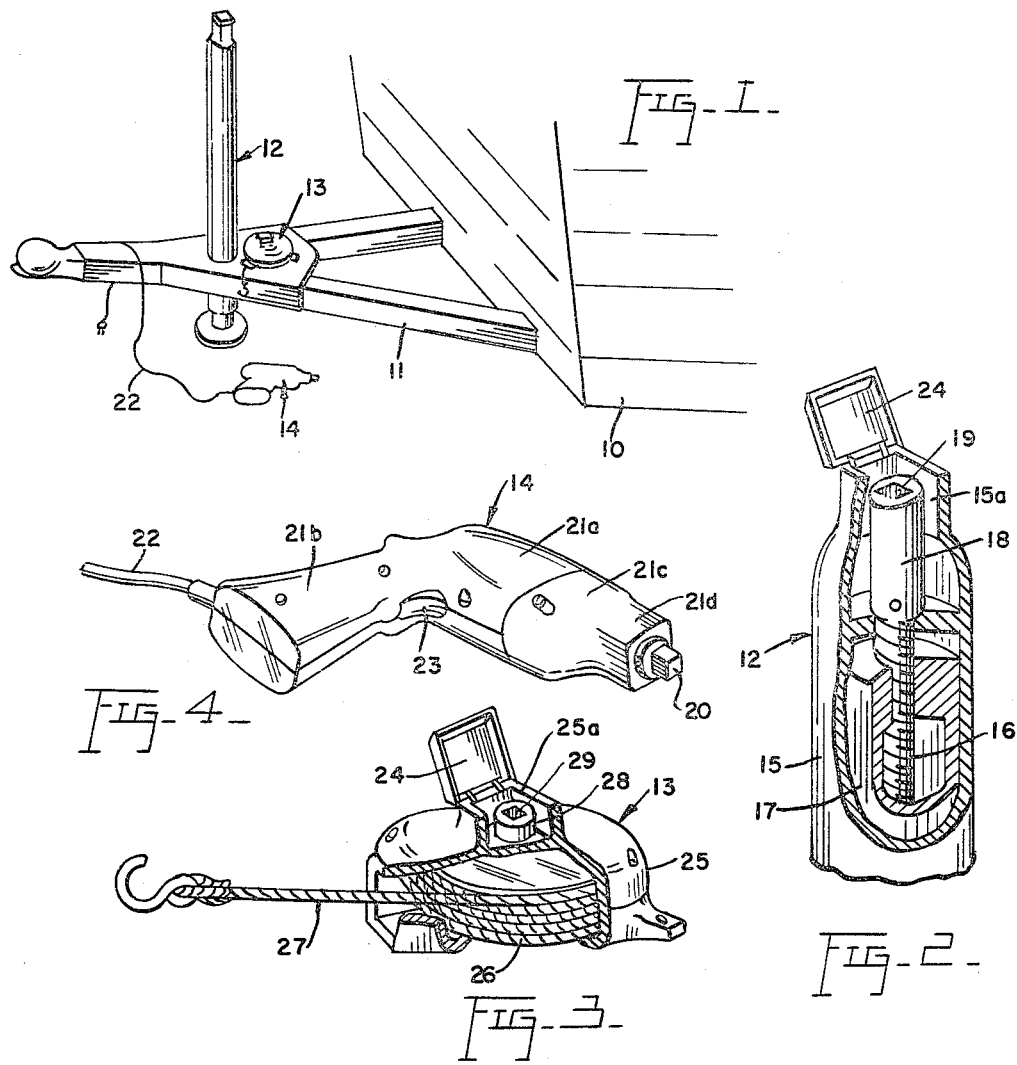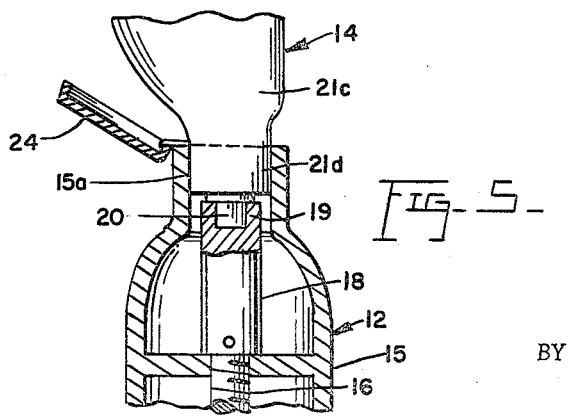

3,490,547
PORTABLE POWER TOOL FOR
DRIVING IMPLEMENTS
John O. Stewart, Rte. 1, Russellville, Ark. 72801
Filed May 22, 1968, Ser. No. 731,049
Int. Cl. B25b 21/00
U.S. Cl. 173—29      2 Claims

ABSTRACT OF THE DISCLOSURE

A portable hand-held power tool having a motor-driven element which is removably applicable to a rotatable member of an implement to be driven. The tool and the implement have complemental housing portions which are non-rotatably engageable with each other to prevent rotation of the hand-held tool relative to the implement under reactive torque incident to transmission of the drive.

---

This invention relates to new and useful improvements in the art of transmitting a rotary drive from a portable, hand-held power tool to an implement driven thereby. The power tool may be a portable electric motor, for example, having a drive element which is removably applicable to a rotatable driven member of the implement, and the implement itself may be of any suitable nature, as for example, a screw jack, a winch, or any other mechanism which requires a rotary drive for its actuation.

In an environment of this general type the drive element of the power tool is operatively engaged with the driven member of the implement, and when the power tool is energized to produce rotation, a reactive torque comes into being which produces a strong tendency of the hand-held power tool to rotate in a direction opposite to that in which the implement is driven. This reactive torque must be overcome by holding the power tool with a firm hand grip, but if this should be insufficient, the power tool often slips out of hand, becomes disconnected from the implement, and serious damage or injury may result.

It is, therefore, the principal object of the invention to eliminate the undesirable condition as outlined above, this being attained by the provision of means for absorbing reactive torque at the connection of the power tool to the implement, that is to say, by preventing relative rotation between the tool and the implement, so that the power tool may be simply held in its operative position without the necessity of manually resisting the reactive torque.

Briefly, the invention resides in providing the power tool and the implement with complemental housing portions which become non-rotatably engaged when the drive element of the tool is applied to the driven member of the implement. Thus, the reactive torque incident to the transmission of drive is absorbed by the non-rotatably engaged housing portions and need not be manually counteracted in the grip of the hand-held power tool. The arrangement of the invention is simple in construction, efficient in operation and, as already indicated, capable of embodiment in driven implements of various different types.

With the foregoing more important object and features in view and such other objects and features as may become apparent as this specification proceeds, the invention will be understood from the following description taken in conjunction with the accompanying drawings, wherein like characters of reference are used to designate like parts, and wherein:

FIG. 1 is a fragmentary perspective view showing, as an example, two implements, namely, a jack and a winch associated with a trailer, and the power tool for driving the implements;

FIG. 2 is a fragmentary perspective view, partly in section, of the jack;

FIG. 3 is a perspective view, partly in section, of the winch;

FIG. 4 is a perspective view of the power tool; and

FIG. 5 is a fragmentary view of the power tool in elevation, applied to the jack, shown in section.

Referring now to the accompanying drawings in detail, FIG. 1 for illustrative purposes shows a trailer 10 a draw-bar assembly 11 on which is mounted a screw-type jack 12 and a cable winch 13. The jack and the winch represent two of many different types of mechanisms which in many different environments may be driven by a portable, hand-held power tool 14 in accordance with the invention.

In the instance illustrated, the jack 12 has an elongated housing 15 in which is rotatably journalled an actuating screw 16, the screw being suitably held against axial movement and operatively engaging an internally screw-threaded traveler 17, arranged in any suitable manner for any particular jacking or lifting operation. The upper end of the screw 16 has secured thereto a member 18 formed with a polygonal socket 19 for removable reception of a complemental, polygonal drive element 20 on the power tool 14 as hereinafter described. Thus, the portable, hand-held power tool 14 may be applied to the jack 12 by inserting the element 20 in the socket 19 of the member 18, and when the power tool is energized, rotation will be imparted to the screw 16 for actuating the jack.

The portable power tool 14 may conveniently assume the form of a portable electric motor similar to that in a portable electric drill, the tool embodying a housing such as may include a motor-encasing portion 21a, a pistol-type handgrip 21b, and a nose portion 21c on which the drive element 20 is provided, the portion 21c also containing a suitable reduction gear drive between the motor and the element 20, if such drive is desirable or necessary. The extension cord of the power tool 14 is indicated at 22 and a trigger-type switch thereof appears at 23.

It will be understood that, ordinarily, when the tool 14 is applied to the implement 12 by inserting the drive element 20 into the socket 19 of the driven member 18, the transmission of the drive from the tool to the implement produces a reaction torque by which the entire tool 14 has a tendency to rotate about the axis of the element 20 in a direction opposite to that of the transmitted drive. This reacion torque must be counteracted manually by a firm hand grip on the power tool, but if this should not be adequate, then the tool may easily jump off the implement and damage or injury may result. The invention eliminates such a possibility by providing means for preventing rotation of the power tool 14 relative to the implement 12, such means being effective to absorb the reaction torque at the point of connection of the tool to the implement, so that the power tool may be simply and easily held in place, without the necessity of counteracting the reaction torque manually.

For this purpose the nose portion 21c of the housing of the tool 14 is shaped so as to provide a non-circular or polygonal adapter 21d immediately adjacent the drive element 20. Moreover, the portion of the implement housing 15 which surrounds the driven member 18 is similarly shaped to provide a non-circular or polygonal socket 15a, the arrangement being such that when the drive element 20 is inserted in the socket 19 of the driven member 18, the adapter 21d is simultaneously received in the socket 15a. Inasmuch as the adapter and the socket are non-circular or polygonal, rotation of the housing of the power tool 14 relative to the implement housing 15 is effectively prevented. If desired, the socket 15a of the implement housing 15 may be provided with a hinged cover 24 for closing the socket when the power tool 14 is removed from the implement.

The cable winch 13 shown in FIG. 3 is another type of implement which may be driven by the power tool 14. The winch includes a housing 25 containing a rotatable reel 26 on which the cable 27 is wound. The reel 26 is rotated by a member 28 formed with a socket 29 to receive the drive element 20 of the power tool. The housing 25 is formed with a polygonal socket portion 25a in which the member 28 is disposed, the socket portion 25a receiving the polygonal adapter 21d of the power tool.

While in the foregoing there have been described and shown the preferred embodiments of the invention, various modifications may become apparent to those skilled in the art to which the invention relates. Accordingly, it is not desired to limit the invention to this disclosure and various modifications and equivalents may be resorted to, falling within the spirit and scope of the invention as claimed.

What is claimed as new is:

1. The combination of a driven implement and a portable hand-held power tool removably applicable to said implement for driving same, said implement including an implement housing fixedly mounted on a stationary support, and a rotatable driven member rotatably mounted within said implement housing, and said power tool including a power tool housing, a motor mounted within said power tool housing and a motor-driven rotatable drive element drivingly engageable with said driven member, said power tool housing having a handle portion, a motor encasing portion, and a polygonal nose portion from which said drive element extends, said implement housing including a polygonal socket portion complemental to said nose portion surrounding said driven element and nonrotatably receiving said polygonal nose portion, and said drive element and said driven element having complemental polygonal socket and polygonal stud engaging means whereby said drive element and said driven element become drivingly engaged upon the insertion of said nose portion into said socket portion.

2. A portable power tool for drivingly engaging a driven implement which includes housing and a driven element rotatably mounted therein, said power tool having a power tool housing including a motor encasing portion, a handle portion and a polygonal nose portion connected to said motor encasing portion, a motor mounted in said housing, and a motor driven shaft extending through said nose portion with a polygonal end projecting outwardly from said nose portion, said polygonal nose portion and said polygonal end being adapted to be inserted into complemental sockets on said implement housing and on said driven element respectively whereby said motor driven shaft will drivingly engage said driven element while said power tool housing is held fixed against rotation by said implement housing.

References Cited

UNITED STATES PATENTS

| | | | |
|---|---|---|---|
| 1,691,200 | 11/1928 | Krug | 64—4 |
| 1,768,083 | 6/1930 | Lansing | 310—50 X |
| 2,762,403 | 9/1956 | Ferm et al. | 81—57 |
| 2,896,911 | 7/1959 | Carpenter | 242—54 X |
| 3,397,601 | 8/1968 | Batten | 81—56 |

ERNEST R. PURSER, Primary Examiner

U.S. Cl. X.R.
64—4; 173—163